(12) United States Patent
Aikawa et al.

(10) Patent No.: US 7,430,353 B2
(45) Date of Patent: Sep. 30, 2008

(54) POLARIZATION-MAINTAINING OPTICAL FIBER AND OPTICAL FIBER GYRO

(75) Inventors: Kazuhiko Aikawa, Sakura (JP); Katsuaki Izoe, Sakura (JP); Kazuyuki Hayashi, Sakura (JP); Manabu Kudoh, Sakura (JP)

(73) Assignee: Fujikura Ltd., Tokyo (JP)

( * ) Notice: Subject to any disclaimer, the term of this patent is extended or adjusted under 35 U.S.C. 154(b) by 137 days.

(21) Appl. No.: 11/474,416

(22) Filed: Jun. 26, 2006

(65) Prior Publication Data

US 2007/0116417 A1    May 24, 2007

(30) Foreign Application Priority Data

Jun. 29, 2005 (JP) ............................. P2005-190246

(51) Int. Cl.
*G02B 6/02* (2006.01)
(52) U.S. Cl. ...................................... 385/123
(58) Field of Classification Search .......... 385/123–128
See application file for complete search history.

(56) References Cited

U.S. PATENT DOCUMENTS

| | | | |
|---|---|---|---|
| 5,482,525 A * | 1/1996 | Kajioka et al. ............... 65/398 |
| 2002/0001444 A1* | 1/2002 | Hirano et al. ............... 385/123 |
| 2002/0057880 A1* | 5/2002 | Hirano et al. ............... 385/127 |

FOREIGN PATENT DOCUMENTS

| JP | 62008105 | * | 1/1987 |
|---|---|---|---|
| JP | 63-106519 A | | 5/1988 |
| JP | 2003-337238 A | | 11/2003 |

OTHER PUBLICATIONS

K. Himeno, et al., "Polarization-maintaining Optical Fibers" Fujikura Technical Review, No. 85, p. 1 published Oct. 1993.
H"HB-G Polarization Maintaining Fiber", http://www.fibercore.com/06hb-hbg.php (Fibercore Limited).
Emslie, C: "speciality fiber guides gyroscopes out of the fog" Military & Aerospace Electronics, Jan. 1, 2004, pp. 1-5 XP002396609.
Burns, W.K.: "Optical Fiber Rotation Sensing" 1994, Academic Press, San Diego, Cal.US, XP002396612, p. 355-p. 384.
Senior, J.M.: "Optical Fiber Communications" 1992, Prentice Hall, XP002396613 p. 141-p. 145.

* cited by examiner

*Primary Examiner*—Brian Healy
*Assistant Examiner*—Charlie Peng
(74) *Attorney, Agent, or Firm*—Sughrue Mion, PLLC (57) ABSTRACT

A polarization-maintaining optical fiber comprises: a core; a pair of stress-applying parts disposed one at each side of the core; and a cladding which surrounds the core and the stress-applying parts; wherein when the polarization-maintaining optical fiber is used at a wavelength of 0.81 µm to 0.87 µm, a cut-off wavelength measured with a fiber length of 2 m is longer than the wavelength used and polarization crosstalk when a fiber having a length of 1,000 m is wound on a reel having a diameter of 40 mm is equal to or less than −35 dB/100 m.

9 Claims, 4 Drawing Sheets

POLARIZATION-MAINTAINING OPTICAL FIBER AND OPTICAL FIBER GYRO

CROSS-REFERENCE TO RELATED APPLICATION

This application is based upon and claims the benefit of priority from Japanese Patent Application No. 2005-190246, filed Jun. 29, 2005, in the Japanese Patent Office, the disclosure of which is incorporated herein in its entirety by reference.

BACKGROUND OF THE INVENTION

1. Field of the Invention

Devices, systems, and methods consistent with the invention relate to a polarization-maintaining optical fiber which is suitable for production of optical fiber gyros that are used on moving bodies, such as aircraft, for precise attitude and position controls. More specifically, the present invention relates to a polarization-maintaining optical fiber whose performance does not easily deteriorate when bent with a small bending radius and has a stabilized performance, and to an optical fiber gyro using the same.

2. Description of the Related Art

Figure 1:
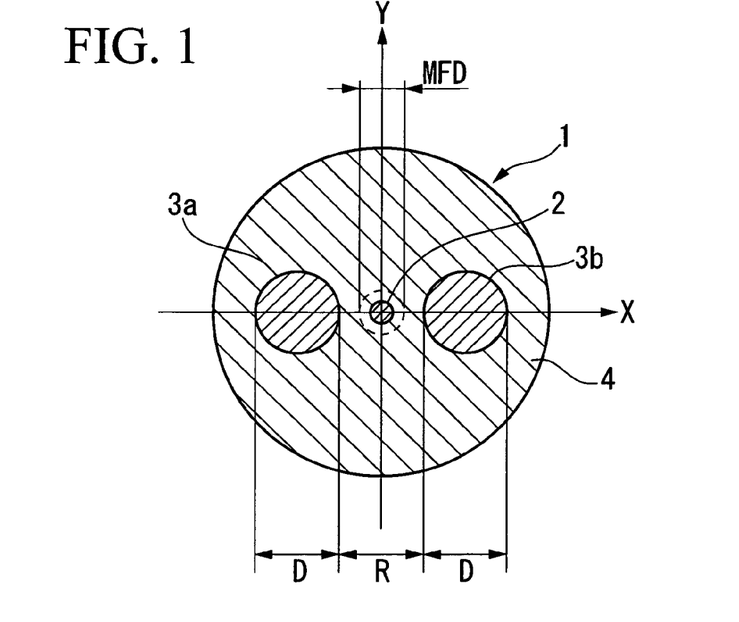
FIG. 1 is a schematic cross-sectional view illustrating an exemplary polarization-maintaining optical fiber.

Polarization-maintaining optical fibers are single-mode optical waveguides (single-mode fibers) which can implement optical transmission while maintaining linear polarization. FIG. 1 illustrates a typical structure thereof. A polarization-maintaining optical fiber 1 is formed by a central core 2, a pair of stress-applying parts 3a and 3b disposed at opposed sides with respect to the core 2, and a cladding 4 which surrounds the core 2 and the stress-applying parts 3a and 3b. The stress-applying parts 3a and 3b of the polarization-maintaining optical fiber 1 are a pair of glass areas used to induce a birefringence in the core 2, extending in a lengthwise direction, and which are separately provided within the cladding 4 and located in diametrically opposed positions. One heretofore known type thereof is characterized in that a thermal expansion coefficient of the stress-applying parts 3a and 3b is different from that of the cladding 4 and that a dimension in cross-section of at least one of the stress-applying parts 3a and 3b is larger than a diameter of the core 2. A polarization-maintaining optical fiber including such a structure is called a PANDA (Polarization-maintaining and absorption-reducing optical fiber).

Polarization-maintaining optical fibers have been conventionally employed as optical fibers for coupling optical components which exhibit polarization dependence. In addition, the polarization-maintaining optical fibers themselves are manufactured so as to form optical transmission components, e.g., fiber gratings and optical fiber couplers, such that they are used in optical transmission devices and various types of measuring equipment, e.g., optical fiber gyroscopes (see, Japanese Unexamined Patent Application, First Publication No. 63106519).

Each of the conventional polarization-maintaining optical fibers generally has a structure as shown in FIG. 1, including a cladding whose diameter (hereinafter referred to as simply "cladding diameter") is 125 µm, and since such fibers are easy to manufacture, they can be manufactured with uniform quality, and can be easily coupled to conventional silica-based optical waveguide fibers.

Such polarization-maintaining optical fibers having the foregoing characteristics are put to a proof-test. Among spools having a diameter of 60 mm through 40 mm, each of the fibers tested are wound onto a spool having a diameter corresponding to the result of the proof-test. Thereafter, they are incorporated or mounted in optical transmission devices and various types of measuring equipment. Such spool diameters are set in consideration of possible effects of amounts of deformation applied to claddings on the reliability and effects on optical fiber characteristics due to bending.

In an optical fiber gyroscope, e.g., a polarization-maintaining optical fiber in which the fiber is to be wound around a small-diameter spool or with a small bending radius, if the fiber has a cladding 125 µm in diameter as usual, problems arise in which deformation causes strength reduction, thus resulting in deteriorated reliability. To respond to this, a polarization-maintaining optical fiber with a small cladding diameter of 80 µm has been developed (Japanese Unexamined Patent Application, First Publication No. 2003-337238, Fujikura Technical Review, No. 85, p. 1 to p. 9 (published on October 1993), and http://www.fibercore.com/06hb-hbg.php (homepage of Fibercore Limited)).

The above-described Fujikura Technical Review discloses a polarization-maintaining optical fiber in which a cladding is made to a minute diameter of 80 µm, for use in gyroscopes. This polarization-maintaining optical fiber for gyroscopes is structured such that, in order to reduce microbend loss, the fiber has a larger relative refractive index difference Δ between a core and a cladding (hereinafter referred to simply as "relative refractive index difference") than that of a conventional polarization-maintaining optical fiber, and that the fiber has a smaller mode field diameter (hereinafter referred to as "MFD").

However, as described above, if an MFD is made smaller, there arises the disadvantage that splice loss tends to increase due to an axial offset incurred when implementing fusion-splicing.

Japanese Unexamined Patent Application, First Publication No. 2003-337238 discloses fiber parameters which are optimized and designed to solve the above problem. More specifically, this patent publication discloses a polarization-maintaining optical fiber which includes a core, a pair of stress-applying parts provided on opposed sides with respect to the core, and a cladding which surrounds the core and the stress-applying parts, wherein a diameter of the cladding is between 70 µm and 90 µm, a diameter of the stress-applying parts is between 21 µm and 32 µm, a distance between the stress-applying parts is between 6 µm and 17 µm, and a relative refractive index difference (between the core and the cladding) is between 0.3% and 0.5%.

Further, Fibercore Limited offers fibers for fiber optic gyroscopes. The specifications thereof are as follows: cut-off wavelength is between 680 nm and 780 nm, and a diameter of a cladding (of a fiber having an MFD 4.2 µm) is 80 µm. According to their brochure, when 500 m of the fiber is wound around a spool whose outside diameter is 40 mm, −27 dB in polarization crosstalk is obtained. However, when the fiber is wound by a further longer length around a further smaller diameter spool, polarization crosstalk is deteriorated.

SUMMARY OF THE INVENTION

The present invention has been made in light of the above-described circumstances. An exemplary object of the present invention is to provide a polarization-maintaining optical fiber in which deterioration of polarization is small even when the fiber is wound by a longer length thereof around a smaller diameter spool and to provide an optical fiber gyroscope which uses this polarization-maintaining optical fiber, the gyroscope being small in size and having high performance.

In order to achieve the above object, according to a first exemplary aspect of the present invention, a polarization-maintaining optical fiber comprises: a core; a pair of stress-applying parts disposed one at each side of the core; and a cladding which surrounds the core and the stress-applying parts; wherein when the polarization-maintaining optical fiber is used at a wavelength of 0.81 µm to 0.87 µm, a cut-off wavelength measured with a fiber length of 2 m is longer than the wavelength used and polarization crosstalk when a fiber having a length of 1,000 m is wound on a reel having a diameter of 40 mm is equal to or less than −35 dB/100 m.

According to a second exemplary aspect of the present invention, a polarization-maintaining optical fiber comprises: a core; a pair of stress-applying parts disposed one at each side of the core; a cladding which surrounds the core and the stress-applying parts; and a coating surrounding the cladding; wherein a diameter of the cladding is within the range of 70 µm to 90 µm; a diameter of a coating is within the range of 160 µm to 180 µm; a diameter of each of the stress-applying parts is within the range of 20 µm to 35 µm; a distance between the stress-applying parts is within the range of 4 µm to 7 µm; a relative refractive index difference between the core and the cladding is within the range of 0.60% to 0.85%; and a cut-off wavelength measured with a fiber length of 2 m is within the range of 0.85 µm to 0.92 µm.

According to a third exemplary aspect of the present invention, a polarization-maintaining optical fiber comprises: a core; a pair of stress-applying parts disposed one at each side of the core; a cladding which surrounds the core and the stress-applying parts; and a coating surrounding the cladding; wherein a diameter of the cladding is within the range of 70 µm to 90 µm; a diameter of a coating is within the range of 160 µm to 180 µm; a diameter of each of the stress-applying parts is within the range of 20 µm to 35 µm; a distance between the stress-applying parts is within the range of 4 µm to 7 µm; a relative refractive index difference between the core and the cladding is within the range of 0.60% to 0.85%; a cut-off wavelength measured with a fiber length of 2 m is longer than the wavelength used; and polarization crosstalk when a fiber having a length of 1,000 m is wound on a reel having a diameter of 40 mm is equal to or less than −35 dB/100 m.

In a polarization-maintaining optical fiber according to any one of the first to third aspects, a modal birefringence may be within the range of $5.5 \times 10^{-4}$ to $8.0 \times 10^{-4}$ and a mode field diameter at a wavelength of 0.85 µm may be within the range of 4.0 µm to 4.4 µm.

An optical fiber gyro is provided, comprising a polarization-maintaining optical fiber according to one of the above exemplary aspects of the present invention, wherein a fiber having a length of 500 m is wound on a reel having a diameter of 60 mm or less.

According to an exemplary polarization-maintaining optical fiber of the present invention, even if the diameter of a cladding is reduced to within 70 µm to 90 µm and more specifically within 77 µm to 83 µm, superior polarization-maintaining characteristics or properties may be obtained. Further, a cut-off wavelength measured with a fiber length of 2 m is longer than the wavelength used, and therefore, deterioration of polarization crosstalk can be reduced even when the fiber is wound with a longer fiber length on a bobbin having a smaller diameter. As a result, a high performance type optical fiber gyro having a further reduced size can be realized.

A fiber gyro according to an exemplary embodiment of the present invention comprises a structure in which the polarization-maintaining optical fiber according to the present invention having a length of 500 m or more is wound on a reel having a diameter of 60 mm or less. Therefore, the fiber gyro can have a more favorable polarization crosstalk characteristic and be farther reduced in size than existing products. As a result, it is possible to downsize different types of devices each of which incorporates a fiber gyro such as the aforesaid optical fiber gyro.

The above and still further exemplary objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

The above exemplary features and advantages of the invention will become more apparent to those skilled in the art by the following detailed description of exemplary embodiments thereof with reference to the attached drawings in which.

DETAILED DESCRIPTION OF EXEMPLARY
EMBODIMENTS OF THE INVENTION

Hereinafter, exemplary embodiments of the present invention will be described in detail with reference to the drawings. Note that parts and portions thereof which are common thereto (or which can be used in common) are denoted by the same reference numerals, and repeat descriptions thereof will be appropriately omitted.

Firstly, at a time of bobbin-winding implementation, changes in cut-off wavelength (hereinafter properly abbreviated to "cut-off") were measured and determined by the present inventors. Table 1 lists the results measured as to dependency of cut-off wavelength upon bending radii and fiber lengths.

TABLE 1

| | Δ | | | | | | | |
|---|---|---|---|---|---|---|---|---|
| | 0.85% | | 0.66% | | 0.85% | | 0.66% | |
| | A [mm φ] | | | | | | | |
| B [mm] | cut-off shift amount [nm] 20 mm φ | cut-off shift amount [nm] 280 mm φ | cut-off shift amount [nm] 60 mm φ | cut-off shift amount [nm] 280 mm φ | cut-off wavelength [nm] 20 mm φ | cut-off wavelength [nm] 280 mm φ | cut-off wavelength [nm] 60 mm φ | cut-off wavelength [nm] 280 mm φ |
| 2 | 0.900 | 1.000 | 0.965 | 1.000 | 1035 | 1150 | 772 | 800 |
| 50 | | | 0.925 | | | | 740 | |
| 10 | 0.852 | 0.978 | | | 980 | 1125 | | |
| 100 | | | 0.925 | | | | 740 | |
| 861 | | 0.954 | | | | 1097 | | |

A = Bending radius
B = Fiber length

Cut-off shift amount=Cut-off wavelength when fiber length of B m & bending diameter of A mm φ/cut-off wavelength when fiber length of 2 m & bending diameter of 280 mm φ

Figure 2:
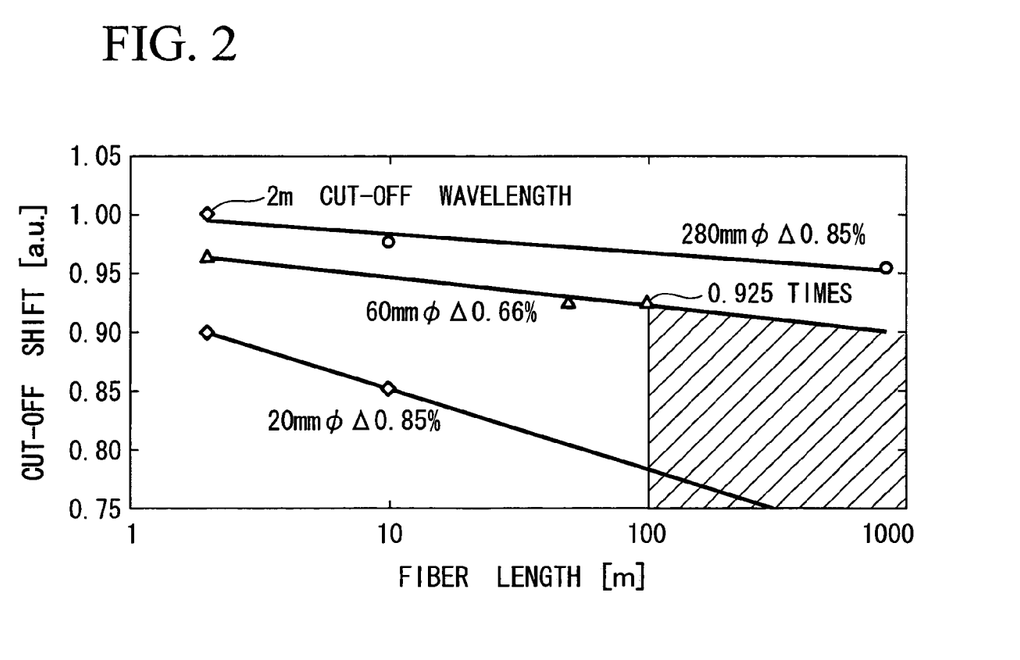
FIG. 2 is a graph illustrating amounts of cut-off shifts of cut-off wavelengths when wound on a bobbin with respect to a 2 m cut-off wavelength.

FIG. 2 illustrates shift amounts compared with the cut-off wavelength according to the 2 m-method recommended in ITU-T G. 650 chapter 5.3.2 (hereinafter properly referred to as simply "2 m cut-off wavelength").

According to winding conditions adopted in typical optical fiber gyroscopes, a fiber length is between several hundreds of meters and 1 km and a bending radius is between 15 mm φ and 40 mm φ. In FIG. 2, within the shaded area, a bending radius is less or equal to 60 mm φ and a fiber length is greater or equal to 100 m. With a margin considered, an amount of cut-off shift is set to be smaller as one condition, as compared to those used in general optical fiber gyroscopes. It can be said that, under these conditions, when wound around a bobbin, a cut-off wavelength is shifted to 0.925 or less times the former. The 2 m cut-off wavelength should be less than or equal to (850 nm/0.925 times=) 919 nm, in order to assure a single-mode operation at a terminal end of the fiber when an operation wavelength is 850 nm and when the fiber is wound on the bobbin with a bending radius of 60 mm φ and with a fiber length of 100 m.

Figure 3:
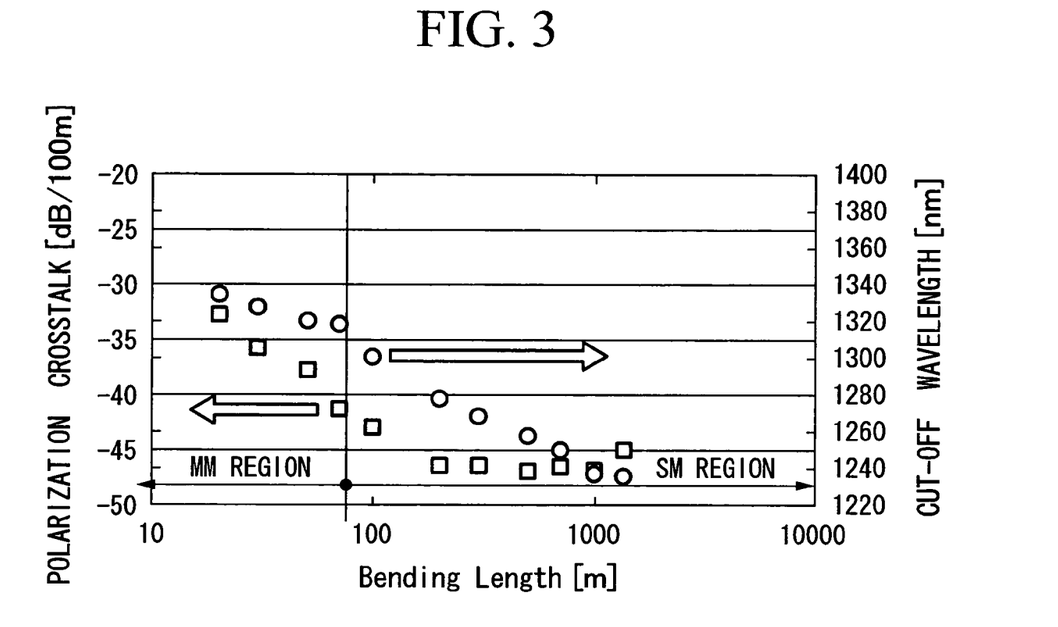
FIG. 3 is a graph illustrating a lengthwise-directional dependency of polarization crosstalk.

Next, an experiment on polarization crosstalk when wound on the bobbin was then carried out. When the 2 m cut-off wavelength is set to be greater than the operating wavelength, light is propagated in a multi mode via a fiber section between an inlet end and a point at a predetermined distance therefrom. Once a mode coupling of a higher order mode ($LP_{11}$) and a fundamental mode ($LP_{01}$) is made, polarization crosstalk is deteriorated. FIG. 3 illustrates a fiber length dependence of polarization crosstalk. An experiment was performed at a wavelength of 1,310 nm under conditions where an optical fiber wire having a 2 m cut-off wavelength of 1,380 nm was used and wherein a winding radius was 300 mm and a relative refractive index difference Δ was 0.32%. In FIG. 3, "MM area" is an area in which light is propagated at a multi-mode, and "SM area" is an area in which light is propagated at a single-mode. When a fiber length is around twice each length of those in the MM area, no influence is imparted by the higher order mode. Thus, polarization crosstalk of −45 dB/100 m or less can be obtained. This shows that there is almost no mode-coupling between the two modes.

Figure 4:
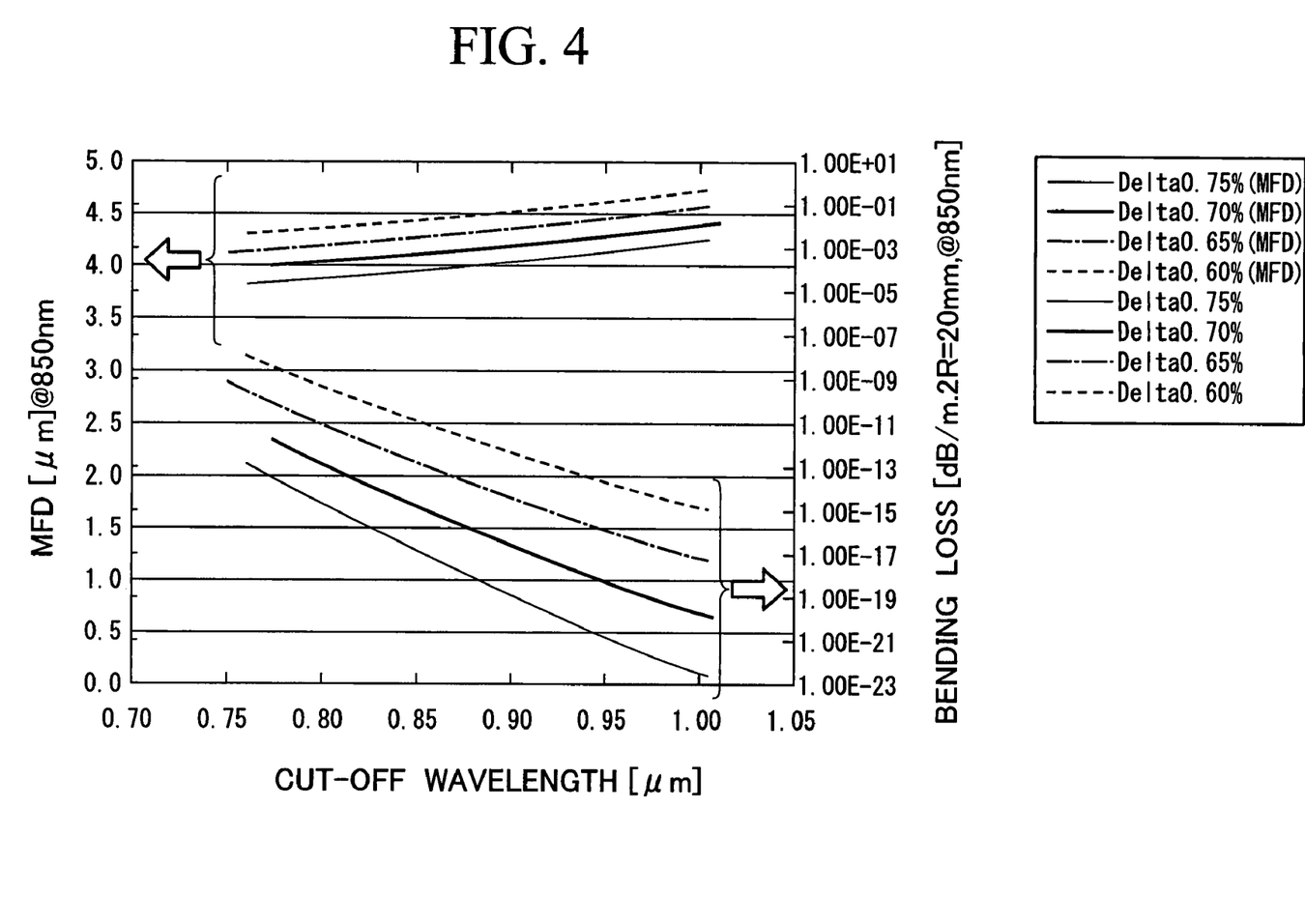
FIG. 4 is a graph illustrating a relationship between an MFD and a cutoff wavelength when a relative refractive index difference is changed.

FIG. 4 illustrates a cut-off wavelength dependence of an MFD and a bending loss when a relative refractive index difference is changed. As can be seen from the result shown in FIG. 4, when an MFD increases, a relative refractive index difference Δ decreases. As a result, deterioration of polarization crosstalk due to bending loss becomes remarkable. When a 2 m cut-off wavelength is set to be less or equal to 0.80 μm, it is necessary for a relative refractive index difference Δ to be set to be 0.60%. Here, when a cut-off wavelength is set to be 0.92 μm, a relative refractive index difference Δ can be set to be 0.70%. In this case, a bending loss can be reduced from $10^{-9}$ dB/m level to $10^{-18}$ dB level. Therefore, even if a fiber is bent with a bending radius smaller than those of conventional fibers, deterioration of polarization crosstalk due to bending loss can be prevented.

According to the above results, in an exemplary polarization-maintaining optical fiber of the present invention, a target of relative refractive index difference Δ is 0.7%, a target of cut-off wavelength is 0.9 μm, and an MFD is between 4.2 μm and 4.3 μm.

Figure 5:
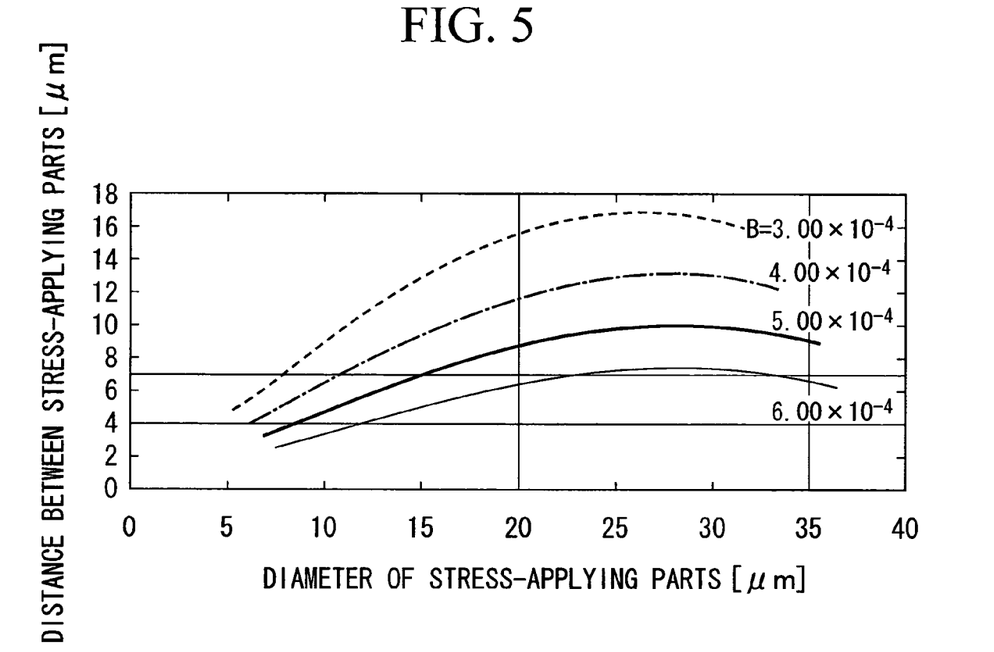
FIG. 5 is a graph illustrating a relationship in terms of modal birefringence between a distance between the stress-applying parts and a diameter of the stress-applying parts.

FIG. 5 is a graph illustrating a computed relationship in terms of modal birefringence between the distance between the stress-applying parts and the diameter of the stress-applying parts. In the case of the PANDA polarization-maintaining optical fiber as shown in FIG. 1, modal birefringence B can be expressed by the following equation (1) (P. L. Chu et. al: "Analytical Method for Calculation of Stress and Material Birefringence in Polarization-Maintaining Optical Fiber," J. of Lightwave Technology. Vol. LT-2, No. 5, October 1984).

$$B \cong \frac{2EC}{1-v}(\alpha_2 - \alpha_3)T\left(\frac{d_1}{d_2}\right)^2 \cdot \left\{1 - 3\left[1 - 2\left(\frac{r}{b}\right)^2\right]\left(\frac{d_2}{b}\right)^4 + 3\left(\frac{r}{d_2}\right)^2\cos 2\theta\right\} \quad (1)$$

In the above equation (1), B is modal birefringence, E is Young's modulus of silica, C is a photoelastic coefficient, v is Poisson's ratio, $\alpha_2$ is thermal expansion coefficient of a cladding 4, $\alpha_3$ is thermal expansion coefficient of stress-applying parts 3a and 3b, T is the difference between the melting point and an actual operating temperature of the stress-applying parts 3a and 3b, $d_1$ is the radius of the stress-applying parts 3a and 3b, $d_2$ is the distance between a center of the core 2 and a center of the stress-applying part 3a or 3b, and b is the radius of the cladding 4. Further, r and θ indicate a coordinate of a given point within a polarization-maintaining optical fiber 1 with respect to the origin, i.e., the center of the core 2. When r=0, the equation (1) represents a central value of modal birefringence of the polarization-maintaining optical fiber 1.

In the equation (1), the term expressed by the following equation (2) is determined by a material of which the stress-applying parts 3a and 3b are made.

$$\frac{2EC}{1-v}(\alpha_2 - \alpha_3)T \quad (2)$$

The stress-applying parts 3a and 3b are generally made of $B_2O_3$-doped silica, and the amount of $B_2O_3$ is preferably 21% or less, by mass, in terms of weight concentration of $B_2O_3$ (see, e.g., Japanese Unexamined Patent No. 2002-214465).

A material of the stress-applying parts 3a and 3b can be expressed using empirically known values as follows: E of 7830 kg/mm$^2$, v of 0.186, and $(\alpha2 - \alpha3)T$ of $1.69 \times 10^{-3}$.

Further, the term expressed by the following equation (3) is determined by structural parameters of the polarization-maintaining optical fiber 1.

$$\left(\frac{d_1}{d_2}\right)^2 \cdot \left\{1 - 3\left[1 - 2\left(\frac{r}{b}\right)^2\right]\left(\frac{d_2}{b}\right)^4 + 3\left(\frac{r}{d_2}\right)^2 \cos 2\theta\right\} \quad (3)$$

A larger modal birefringence b (or B) can be obtained by increasing diameter d (or D) of the stress-applying parts 3a and 3b and by decreasing the distance r (or R) between the stress-applying parts 3a and 3b.

As seen from FIG. 5, in a polarization-maintaining optical fiber according to an exemplary embodiment of the present invention, in order to obtain a modal birefringence of $5.5 \times 10^{-4}$ or more, it can be said to be preferable that the diameter D of the stress-applying parts is in the range between approximately 20 μm and 35 μm, the distance R between the stress-applying parts is in the range between approximately 4 μm and 7 μm. In consideration of costs and production controllability, the diameter D of the stress-applying parts may be in the range between approximately 20 μm and 27 μm.

According to an exemplary embodiment of the present invention, there is provided a polarization-maintaining optical fiber. This fiber includes: a core; a pair of stress-applying parts disposed one at each side of the core; and a cladding which surrounds the core and the stress-applying parts; wherein the polarization-maintaining optical fiber is used at a wavelength of 0.81 μm to 0.87 μm; wherein a cut-off wavelength measured with a fiber length of approximately 2 m is longer than the wavelength used; and wherein polarization crosstalk when a fiber having a length of 1,000 m is wound on a reel having a diameter of 40 mm is equal to or less than approximately −35 dB/100 m.

In order to obtain such a polarization-maintaining optical fiber as described above, it the diameter of a cladding may be in the range between approximately 70 μm and 90 μm, the diameter of a coating may be in the range between approximately 160 μm and 180 μm, the diameter of stress-applying parts may be in the range between approximately 20 μm and 35 μm, the distance between stress-applying parts may be in the range between approximately 4 μm and 7 μm, the relative refractive index difference between a core and a cladding may be in the range between approximately 0.60% and 0.85%, and the cutoff wavelength measured with a fiber length of 2 m may be in the range between approximately 0.85 μm and 0.92 μm.

According to an exemplary embodiment of the present invention, a cut-off wavelength is set to be longer than a wavelength used, and therefore, it is possible to reduce bending loss while maintaining MFD at a higher level. Even when a fiber having a longer length such as a length of approximately 500 m to 1000 m is wound by a small bending radius such as a radius of approximately 15 mm to 40 mm, a superior polarization-maintaining optical fiber with substantially no deterioration can be obtained. Note that, when the aforesaid structural parameters deviate from the above-described range, it may not possible to reduce bending loss while maintaining MFD at a higher level, and therefore, when a long fiber is wound by a small bending radius, polarization crosstalk is inevitably deteriorated.

In an exemplary polarization-maintaining optical fiber according to the present invention, a modal birefringence may be within the range of approximately $5.5 \times 10^{-4}$ to $8.0 \times 10^{-4}$ and a mode field diameter (MFD) at a wavelength of 0.85 μm may be within the range of approximately 4.0 μm to 4.4 μm.

With a structure whose modal birefringence and mode field diameter are within such ranges, a low-loss coupling to peripheral optical devices can be achieved.

Further, an exemplary optical fiber gyro of the present invention is characterized by the fact that the aforesaid polarization-maintaining optical fiber according to the present invention having a length of approximately 500 m or more is wound on a reel having a diameter of approximately 60 mm or less.

By the use of such an optical fiber gyro, it is possible to downsize a whole system while maintaining its properties.

Polarization-maintaining optical fibers having a cross-sectional structure as shown in FIG. 1 were fabricated. Each of those polarization-maintaining optical fibers was designed such that a pair of the stress-applying parts 3a and 3b were disposed in symmetrically opposing positions with respect to a core 2, and that the core 2 and the stress-applying parts 3a and 3b were surrounded by a cladding 4. The core 2 was made of a material having a higher refractive index than a material of the cladding 4, whereas the stress-applying parts 3a and 3b were made of a material having a higher thermal expansion coefficient than the materials of the core 2 and of the cladding 4.

In connection with the above materials, any materials can be used, which are used for fabrication of the conventional PANDA polarization-maintaining optical fibers. For example, according to an exemplary embodiment of the present invention, a structure is exemplified, wherein the core 2 is made of silica glass doped with $GeO_2$ ($GeO_2$-doped silica glass), wherein each of the stress-applying parts 3a and 3b are made of $B_2O_3$—$SiO_2$ glass in which glass is doped with $B_2O_3$ such that the amount of $B_2O_3$ is around 17% through 21%, by mass, in terms of weight concentration of $B_2O_3$, and wherein the cladding 4 is made of pure silica glass ($SiO_2$).

EXAMPLE 1

In regard to manufacturing of polarization-maintaining optical fibers, in the first place, VAD (vapor-phase axial deposition) preforms were fabricated, including a core region made of silica glass doped with $GeO_2$ and a cladding region made of pure silica glass and having relative refractive index differences Δ of 0.70%. Then, core-cladding preforms for PANDA polarization-maintaining optical fibers were obtained by depositing silica glass on the outer periphery of the preforms and sintering the preforms so that a predetermined cut-off wavelength was achieved. Thereafter, by means of an ultrasonic drill, holes of predetermined diameter were drilled in the core-cladding preforms at predetermined positions in such a manner that the holes were located in diametrical opposed positions with respect to the core region.

An inner surface of each hole was ground and polished to a mirror-smooth state in order to obtain drilled preforms.

Additionally, by means of the MCVD (Modified Chemical Vapor Deposition) method, stress-applying preforms made of $B_2O_3$—$SiO_2$ glass were fabricated, which were to be used as stress-applying parts of the polarization-maintaining optical fibers.

These stress-applying preforms were inserted into the drilled preform, and thereafter, the preform was heated and drawn in a drawing furnace in such a manner as to obtain a cladding of 80 μm in diameter. After drawing, the bare optical fiber was coated with two ultraviolet curable acrylate resin layers to obtain an optical fiber wire. At this time, the diameter of the primary coating was about 125 μm and the diameter of the secondary coating was about 170 μm. Structural parameters and optical characteristics of the obtained polarization-maintaining optical fiber (No. 1) were measured. Table 2 presents the results thereof.

TABLE 2

| Structural parameters | UNIT | No. 1 |
| --- | --- | --- |
| Relative refractive index difference | % | 0.70 |
| Diameter of stress-applying part | μm | 21 |
| Distance between stress-applying parts | μm | 4.2 |
| Diameter of cladding | μm | 80 |
| Diameter of coating | μm | 170 |
| Optical characteristic | nm | 850 |
| MFD | μm | 4.2 |
| Beat-length | mm | 1.4 |
| Modal birefringence | ×10$^{-4}$ | 6.1 |
| Cut-off wavelength | μm | 0.90 |
| Attenuation | dB/km | 2.4 |
| Bending Loss | dB/m, 2R = 20 mm, @850 nm | 1.5 × 10$^{-10}$ |
| Polarization crosstalk | dB/100 m | −39 |

Results of the polarization-maintaining optical fiber (No. 1) of this example are as follows. It was confirmed that although the cut-off wavelength measured with the 2 m cut-off wavelength was 0.90 μm, the cut-off wavelength measured with a fiber length of 10 m was 0.85 μm when wound on a reel whose diameter was 60 mm. It was also confirmed that, when a fiber having a length of 10 m or more was wound on a reel having a diameter smaller than 60 mm, a single mode was exhibited at 0.85 μm. There were favorable results showing that polarization crosstalk was −39 dB/100 m when a fiber having a length of 1,000 m was wound on a reel having a diameter of 60 mm.

EXAMPLE 2

In regard to manufacturing of polarization-maintaining optical fibers, in the first place, VAD preforms were fabricated, including a core region made of silica glass doped with $GeO_2$ and a cladding region made of pure silica glass and having relative refractive index differences Δ of 0.65%. Then, core-cladding preforms for PANDA polarization-maintaining optical fibers were obtained by depositing silica glass on the outer periphery of the preforms and sintering the preforms so that a predetermined cut-off wavelength was achieved. Thereafter, by means of an ultrasonic drill, holes of predetermined diameter were drilled in the core-cladding preforms at predetermined positions in such a manner that the holes were located in diametrically opposed positions with respect to the core region. An inner surface of each hole was ground and polished to a mirror-smooth state in order to obtain drilled preforms.

Additionally, by means of the MCVD method, stress-applying preforms made of $B_2O_3$—$SiO_2$ glass were fabricated, which were to be used as stress-applying parts of the polarization-maintaining optical fibers.

These stress-applying preforms were inserted into the drilled preform, and thereafter, the preform was heated and drawn in a drawing furnace in such a manner as to obtain a cladding of 80 μm in diameter. After drawing, the bare optical fiber was coated with two ultraviolet curable acrylate resin layers to obtain an optical fiber wire. At this time, the diameter of the primary coating was about 125 μm and the diameter of the secondary coating was about 170 μm. Structural parameters and optical characteristics of the obtained polarization-maintaining optical fiber (No. 2) were measured. Table 3 presents the results thereof.

TABLE 3

| Structural parameters | UNIT | No. 1 |
| --- | --- | --- |
| Relative refractive index difference | % | 0.65 |
| Diameter of stress-applying part | μm | 20 |
| Distance between stress-applying parts | μm | 4.0 |
| Diameter of cladding | μm | 80 |
| Diameter of coating | μm | 170 |
| Optical characteristic | nm | 850 |
| MFD | μm | 4.4 |
| Beat-length | mm | 1.2 |
| Modal birefringence | ×10$^{-4}$ | 7.0 |
| Cut-off wavelength | μm | 0.90 |
| Attenuation | dB/km | 2.2 |
| Bending Loss | dB/m, 2R = 20 mm, @850 nm | 4.5 × 10$^{-15}$ |
| Polarization crosstalk | dB/100 m | −38 |

Results of the polarization-maintaining optical fiber (No. 2) of this example are as follows. It was confirmed that although the cut-off wavelength measured with the 2 m cut-off wavelength was 0.90 μm, the cut-off wavelength measured with a fiber length of 10 m was 0.83 μm when wound on a reel whose diameter was 40 mm. It was also confirmed that, when a fiber having a length of several meters is wound on a reel whose diameter was smaller than 40 mm, a single mode was exhibited at 0.85 μm. There were favorable results showing that polarization crosstalk was −39 dB/100 m when a fiber having a length of 1,000 m was wound on a reel having a diameter of 40 mm.

COMPARATIVE EXAMPLE

VAD preforms were fabricated, including a core region made of silica glass doped with $GeO_2$ and a cladding region made of pure silica glass and having relative refractive index differences Δ of 0.60%. Then, core-cladding preforms for PANDA polarization-maintaining optical fibers were obtained by depositing silica glass on the outer periphery of the preforms and sintering the preforms so that a predetermined cut-off wavelength was achieved. Thereafter, by means of an ultrasonic drill, holes of predetermined diameter were drilled in the core-cladding preforms at predetermined positions in such a manner that the holes were located in diametrically opposed positions with respect to the core region. An inner surface of each hole was ground and polished to a mirror-smooth state in order to obtain drilled preforms.

Additionally, by means of the MCVD method, stress-applying preforms made of $B_2O_3$—$SiO_2$ glass were fabricated, which were to be used as stress-applying parts of the polarization-maintaining optical fibers.

These stress-applying preforms were inserted into the drilled preform, and thereafter, the preform was heated and drawn in a drawing furnace in such a manner as to obtain a cladding of 80 μm in diameter. After drawing, the bare optical fiber was coated with two ultraviolet curable acrylate resin layers to obtain an optical fiber wire. At this time, the diameter of the primary coating was about 125 μm and the diameter of the secondary coating was about 170 μm. Structural parameters and optical characteristics of the obtained polarization-maintaining optical fiber (No. 3) were measured. Table 4 presents the results thereof.

TABLE 4

| Structural parameters | UNIT | No. 1 |
|---|---|---|
| Relative refractive index difference | % | 0.60 |
| Diameter of stress-applying part | μm | 21 |
| Distance between stress-applying parts | μm | 4.2 |
| Diameter of cladding | μm | 80 |
| Diameter of coating | μm | 170 |
| Optical characteristic | nm | 850 |
| MFD | μm | 4.2 |
| Beat-length | mm | 1.4 |
| Modal birefringence | $\times 10^{-4}$ | 6.1 |
| Cut-off wavelength | μm | 0.82 |
| Attenuation | dB/km | 2.4 |
| Bending Loss | dB/m, 2R = 20 mm, @850 nm | $3.3 \times 10^{-17}$ |
| Polarization crosstalk | dB/100 m | −26 |

Results of the polarization-maintaining optical fiber (No. 3) of the comparative example are as follows. It was confirmed that the cut-off wavelength measured with a bending length of 2 m was 0.82 μm. Thus, in this case, shifting of the cut-off wavelength due to a fiber length and a way of winding is not a problem. However, bending loss thereof was higher than that of the fiber according to the present invention. Thus, polarization crosstalk was deteriorated to an extent of −26 dB/100 m when a fiber having a length of 1,000 m was wound on a reel having a diameter of 40 mm.

Note that, in Tables 2 to 4, "attenuation" is a loss, which is caused when each fiber is wound with a large winding radius involving no bending loss, and "bending loss" is a loss which is caused when a fiber is wound with a certain small winding radius (e.g., 2R=20 mm).

Although the invention has been particularly shown and described with reference to specific exemplary embodiments thereof, this description is not meant to be construed in a limiting sense. Various modifications of the disclosed embodiments, as well as alternative embodiments of the invention, will be apparent to persons skilled in the art upon reference to the description of the invention. It is therefore contemplated that such modifications can be made therein without departing from the spirit or scope of the present invention as defined in the appended claims.

What is claimed is:

1. A polarization-maintaining optical fiber comprising:
a core;
two stress-applying parts disposed one at each side of the core; and
a cladding which surrounds the core and the stress-applying parts;
wherein, when the polarization-maintaining optical fiber is used at a wavelength of about 0.81 μm, a cut-off wavelength measured with a fiber length of 2 m is longer than the wavelength used; and
when the polarization-maintaining optical fiber is used at a wavelength of about 0.81 μm and a length of 1,000 m of the polarization-maintaining fiber is wound on a reel having a diameter of 40 mm, polarization crosstalk is equal to or less than −35 dB/100 m.

2. The polarization-maintaining optical fiber according to claim 1, wherein a modal birefringence is within a range of $5.5 \times 10^{-4}$ to $8.0 \times 10^{-4}$ and a mode field diameter at a wavelength of 0.85 μm is within a range of 4.0 μm to 4.4 μm.

3. An optical fiber gyro, comprising a length of 500 m of the polarization-maintaining optical fiber according to claim 1, wound on a reel having a diameter of 60 mm or less.

4. A polarization-maintaining optical fiber comprising:
a core;
two stress-applying parts disposed one at each side of the core;
a cladding which surrounds the core and the stress-applying parts; and
a coating surrounding the cladding;
wherein an outer diameter of the cladding is within a range of 70 μm to 90 μm; a diameter of the coating is within a range of 160 μm to 180 μm; an outer diameter of each of the stress-applying parts is within a range of 20 μm to 35 μm; a distance between the stress-applying parts is within a range of 4 μm to 7 μm; a relative refractive index difference between the core and the cladding is within a range of 0.60% to 0.85%; and a cut-off wavelength measured with a fiber length of 2 m is within a range of 0.85 μm to 0.92 μm.

5. The polarization-maintaining optical fiber according to claim 4, wherein a modal birefringence is within a range of $5.5 \times 10^{-4}$ to $8.0 \times 10^{-4}$ and a mode field diameter at a wavelength of 0.85 μm is within a range of 4.0 μm to 4.4 μm.

6. An optical fiber gyro, comprising a length of 500 m of the polarization-maintaining optical fiber according to claim 4 wound on a reel having a diameter of 60 mm or less.

7. A polarization-maintaining optical fiber comprising:
a core;
two stress-applying parts disposed one at each side of the core;
a cladding which surrounds the core and the stress-applying parts; and
a coating surrounding the cladding;
wherein an the coating is within a range of 160 μm to 180 μm; an outer diameter of each of the stress-applying parts is within a range of 20 μm to 35 μm; a distance between the stress-applying parts is within a range of 4 μm to 7 μm; a relative refractive index difference between the core and the cladding is within a range of 0.60% to 0.85%; a cut-off wavelength measured with a fiber length of 2 m is longer than a wavelength used; and polarization crosstalk when a fiber having a length of 1,000 m is wound on a reel having a diameter of 40 mm is equal to or less than −35 dB/100 m.

8. The polarization-maintaining optical fiber according to claim 7, wherein a modal birefringence is within a range of $5.5 \times 10^{-4}$ to $8.0 \times 10^{4}$ and a mode field diameter at a wavelength of 0.85 μm is within a range of 4.0 μm to 4.4 μm.

9. An optical fiber gyro, comprising a length of 500 m of the polarization-maintaining optical fiber according to claim 7 wound on a reel having a diameter of 60 mm or less.

* * * * *